US006151979A

United States Patent [19]

Cavanagh

[11] Patent Number: 6,151,979

[45] Date of Patent: Nov. 28, 2000

[54] GEAR SHIFTING APPARATUS

[76] Inventor: Paul D. Cavanagh, 254 Middle Rd., Byfield, Mass. 01922

[21] Appl. No.: 09/288,491

[22] Filed: Apr. 8, 1999

[51] Int. Cl.[7] .............................. F16H 4/08; F16D 21/04; F16D 43/02

[52] U.S. Cl. ............................... 74/363; 74/333; 74/337.5

[58] Field of Search .................................... 74/333, 337.5, 74/363, 569

[56] References Cited

U.S. PATENT DOCUMENTS 4,301,690 11/1981 Cavanagh .

*Primary Examiner*—Allan D. Herrmann
*Attorney, Agent, or Firm*—Don Halgren

[57] ABSTRACT

The present invention includes a passive shifting apparatus for a marine winch having a plurality of gears thereon. The passive shifting apparatus permits the winch to be rotated in either a clockwise or counter-clockwise direction, and comprises a central shaft about which the gears rotate, supported on a base in a marine winch housing. A rotatable curvilinear cam is mounted on the shaft. A radially inwardly and outwardly movable cam follower is engaged against the curvilinear cam. A first spring is arranged between the housing and the cam follower to bias the cam follower against the curvilinear cam. A second spring is arranged between the housing and the cam follower to bias the cam follower on the inner end of the shift arm when the cam is counter rotated. The cam follower may then move into and out of a slot in the curvilinear cam, and the cam may be able to rotate either clockwise or counter-clockwise without locking-up the cam follower.

6 Claims, 1 Drawing Sheet

GEAR SHIFTING APPARATUS

BACKGROUND OF THE INVENTION

1. Field of the Invention

This invention relates an arrangement for shifting gears on a marine winch, and more particularly, to an improved cam and shift-arm arrangement for the marine winch shown in U.S. Pat. No. 4,301,690.

2. Prior Art

U.S. Pat. No. 4,301,690 to Cavanagh discloses a marine winch gear shifting apparatus. This U.S. Pat. No. 4,301,690 is incorporated herein by reference in its entirety. The gear shifting means of the '690 Patent is a marine winch that utilizes a drive-shaft with a plurality of freely rotatable gears mounted thereon, and means for making a driving connection between the drive-shaft and any one of the gears. Through the operation of means actuated by limited reverse rotation of the drive-shaft, the connection of the drive-shaft is shifted to a second gear while the first gear is released. The shifting of the connection of the drive-shaft successively to all of the other gears is accomplished in the same manner, mainly, by stopping the drive-shaft and reversing its rotation through a limited angle which movement actuates means for connecting the next gear to the drive-shaft while releasing the previously connected gear. This procedure may be continuously repeated, shifting the connection with the drive-shaft progressively through all of the gears in a predetermined sequence and then returning the connection to the first gear.

As may be seen, however, in FIGS. 4–8 of the above identified '690 Patent, a rotatable cam designated by the numeral "66", has a cam surface 92 with a shoulder thereon which acts as an engager. A pocket, designated by the numeral "96" in the '690 Patent, is arranged to receive the follower, designated by the numeral "80" above the shift arm which is designated by the numeral "72". Proper timing and coordination between the shift-arm 72 and the rotation of cam 66 permits shifting between the gears. The prior art follower 80, which is a pin, may get caught in the cam pocket 96, and be sheared off, or locked therewithin. This may result in a nonfunctioning marine winch.

It is an object of the present invention, to provide an improved shifting mechanism over such as that shown in the prior '690 Patent.

It is a further object of the present invention, to provide a passive shifter arrangement useful in a marine winch as represented in the '690 Patent, which shifter arrangement permits the rotatable cam plate to rotate when necessary, either in a clockwise or counter-clockwise direction, without damaging the mechanism.

It is also a further object of the present invention, to provide a shifting mechanism for a marine winch of the type shown in the '690 Patent, which shifting mechanism is more economical, safer to use and easier than the shifting mechanisms shown in the prior art.

BRIEF SUMMARY OF THE INVENTION

The present invention comprises an improved cam arrangement for a marine winch, of the type described in the above-mentioned U.S. Pat. No. 4,301,690. The improved passive cam of the present invention is an improvement of the positive stop cam designated as numeral 66 in the '690 Patent, by elimination of the cam pocket thereon. The improved passive cam has an inwardly directed cam surface directed inwardly from the circular wall of the cam. The inwardly directed cam surface has a first slight sinusoidal curve extending to a second sweeping cam surface generally parallel to the housing in which the cam sits. The continued surface falls into a "V"-shaped cutout, the "V" having an apogee pointing towards the center of rotation of the passive cam. The "V"-shaped cutout has a shoulder portion which sweeps into a straight cam surface which smoothly transitions itself to the circular wall of the passive cam at a location of about 160 degrees from the first departure from the circular wall of the cam. An elongated longitudinally-displaceable improved shift-arm is registered within an elongated slot in the housing of the base of the marine winch. A compressive first spring is arranged in a first end of the slot and a second end of the spring presses against the radially outermost end of the improved shift-arm. A cam follower is arranged on the uppermost surface of the improved shift-arm, the cam follower being somewhat elongated with a curvilinear first side and a rounded narrowed distal tip. The rounded narrowed distal tip acts as the cam follower, which rides on the curvilinear surface as well as on the circular wall portion defining the peripheral improved passive cam. A second spring, arranged between the wall of the housing and a distal end, is generally perpendicular to the first spring and the longitudinal axis of the shift arm in a manner generally similar to the second spring designated numeral 82 shown in the aforementioned '690 Patent. The "V"-shaped slot or corner in the cam is an improvement over the prior art, which corner or "V"-shaped slot permits the end follower on the distal end of the improved generally radially directed shift-arm to move inwardly and outwardly after the radially inwardly directed force of the first spring is overcome. The strength of the radially inwardly directed first spring is important in that it pushes the cam follower into the pocket of the rotating cam. However, the radially inwardly directed first spring is also weak enough to allow the improved rotary passive cam to back up or rotate in the opposite direction without breaking anything, as may have occurred in the prior art devices represented by the '690 Patent.

Thus the improved passive cam with its indented cam surface, lacking any follower-capturable pockets thereon, permits the shifting of gears because of sufficient tension on the first spring. In this arrangement, the longitudinal axis of the second spring is at a slightly nonorthogonal angle with respect to the longitudinal axis of the first or main spring.

Thus, the new shift apparatus permits a passive shifting because of the improved passive cam plate which is permitted to go around backwardly, that is counterclockwise, without damaging anything, or breaking part of the shifter mechanism.

The invention thus comprises a passive shifting apparatus for a marine winch having a plurality of gears thereon. The passive shifting apparatus permits the winch to be rotated in either a clockwise or counter-clockwise direction, comprises a central shaft about which the gears rotate, supported on a base in a marine winch housing, a curvilinear cam plate rotatable mounted about the shaft, a radially inwardly and outwardly movable cam follower engaged against the curvilinear cam plate, a first spring arranged between the housing and the cam follower to press the cam follower against the curvilinear cam plate, and a second spring arranged between the housing and the cam follower to bias the shift arm against the curvilinear cam plate. The cam follower may move into and out of a slot in the curvilinear cam plate, and the cam plate may be able to rotate either clockwise or counter-clockwise without locking-up the cam follower. The curvilinear cam plate includes a surface portion of generally circular configuration, and a surface portion of sinusoidal configuration. The surface portion of sinusoidal configuration includes a generally "V" shaped slot with an apogee directed towards the central shaft. The first spring and the second spring are arranged at a perpendicular angle with respect to one another. The cam follower includes an elongated shift arm longitudinally disposed in a groove or slot in the housing base, the groove or slot having a width across its inner end which permits the shift arm to have slight lateral movement.

BRIEF DESCRIPTION OF THE DRAWINGS

The objects and advantages of the present invention will become more apparent, when viewed in conjunction with the following drawings, in which.

DESCRIPTION OF THE PREFERRED EMBODIMENTS

Figure 1:
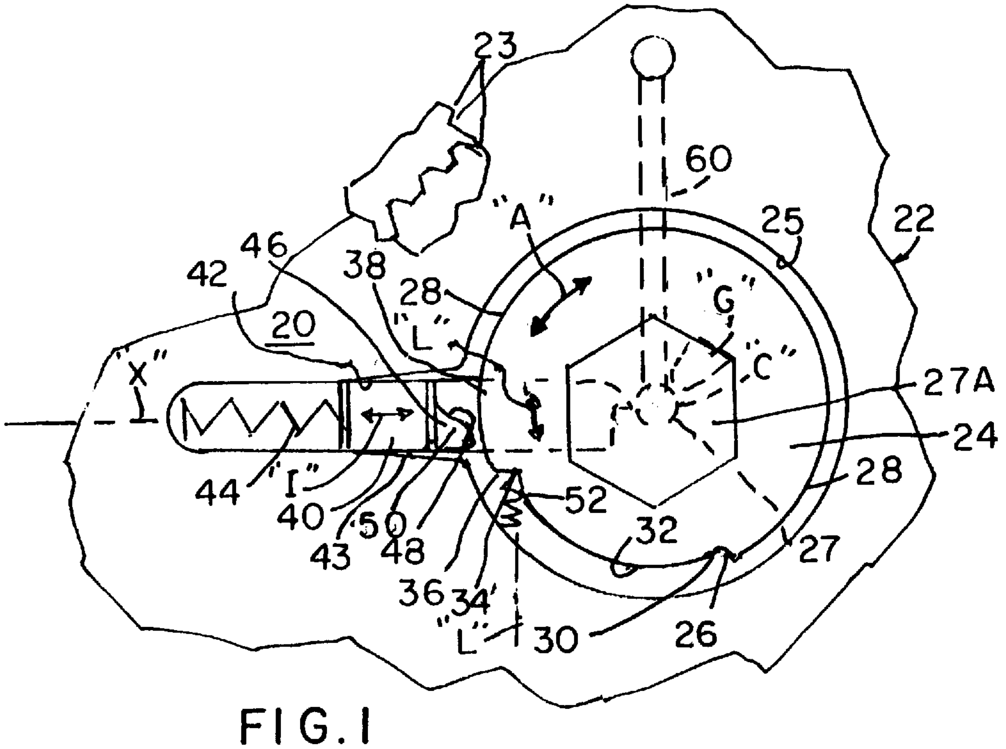
FIG. 1 is a plan view of the improved passive cam and shift-arm arrangement of the present invention.
Figure 1A:
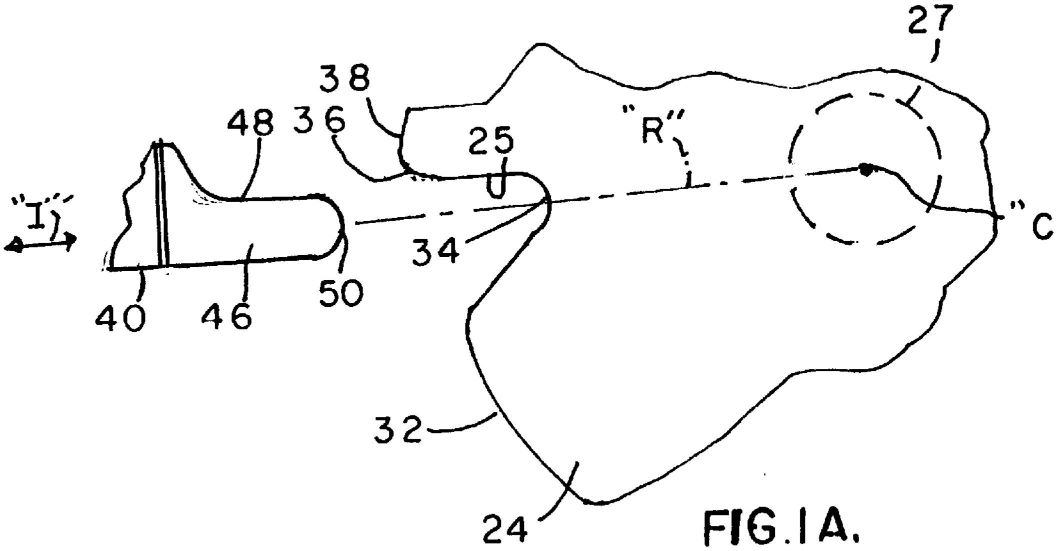
FIG. 1A is an enlarged view of a portion of the improved cam of the present invention.

Preferring now to the drawings in detail, and particularly to FIG. 1, there is shown the present invention which comprises an improved cam arrangement 20, for a marine winch 22, of the type described in the above-mentioned incorporated herein U.S. Pat. No. 4,301,690 having a plurality of gears 23, as shown in that '960 patent, and only partially shown in FIG. 1 herein. The improved passive cam 24 of the present invention comprises a curvilinear plate which rotatively rests upon a circular base housing 25, and is an improvement of the positive stop cam designated as numeral "66" in the '690 Patent by elimination of the "J"-shaped cam-pocket thereon shown in that '690 Patent. The improved passive cam 24 has an inwardly directed cam surface 26 directed inwardly from the circular wall 28 of the cam. The inwardly directed cam surface 26 has a first slight sinusoidal curve surface 30 extending to a second sweeping cam surface 32 generally parallel to the circular perimeter of the curved portion of the cam 24 and to the base housing 25 in which the cam 24 sits. The continued cam surface falls into a "V"-shaped cutout 34, the "V" having an apogee pointing towards the center of rotation "C" of the bore 27 in central shaft 27A at the center of the passive cam 24, and has a first side 25 which is just slightly non-radial by only several (3–10) degrees, as shown in FIG. 1A, which non-radial orientation permits the cam follower 50 to withdraw from the slot 34 during counter-clockwise rotation of the cam 24 without trapping or breaking the cam follower 50 or jamming it in the cam 24, as may occur in prior art cam arrangements. The "V"-shaped cutout 34 has a shoulder portion 36 which sweeps into a straight cam surface 38 which smoothly transitions itself to the circular wall 28 of the passive cam 24 at a location of about 160 degrees from the first departure 30 from the circular wall 28 of the cam 24. An elongated longitudinally-displaceable improved shift-arm 40 is registered within a groove or slot 42 in the housing of the base 25 of the marine winch 22. The groove or slot 42 is slightly wider at its radially innermost end 43 to permit the shift arm 40 to have a slight lateral movement, as indicated by the arrow "L" as well as its longitudinal inward and outward motion. The slight lateral movability of the shift arm 40 permits a non-locking engagement between the shift arm 40 and the passive curvilinear cam 24 disclosed herein during shifting of gears. A compressive first spring 44 is arranged in a radially outermost end of the slot 42. A radially innermost end of the spring 44 presses against the radially outermost end of the shift-arm 40. A cam follower 46 is arranged on the uppermost surface of the shift-arm 40, the cam follower 46 being somewhat elongated with a curvilinear first side 48 and a rounded narrowed distal tip 50, as may be seen in FIGS. 1 and 1A. The rounded narrowed distal tip 50 acts as the cam surface follower, which rides on the curvilinear surface 26 and into the "V" shaped cutout 34, as well as on the circular wall portion 28 defining the peripheral improved passive cam 24. A second spring 52 is arranged between the wall of the housing 25 and the radially innermost end of the improved passive shift arm 40 in a manner generally similar to the second spring designated numeral "82" shown in the aforementioned '690 Patent. The second spring 52 is arranged to bias the shift arm 40 into generally radial alignment "R" with respect to the axis of rotation "C" of the central shaft 27A, only when the arm 40 is moved slightly laterally when shifting gears occurs, that is, when the cam 24 is rotated counter-clockwise or "backwardly". The "V"-shaped slot or corner 34 is an improvement over the "pocket" in the cam of prior art as represented in the aforementioned '690 Patent, which improved corner or "V"-shaped slot 34 of the present invention permits the cam follower 50 on the distal end of the improved generally radially directed shift-arm 40 to not be "caught in the pocket" and the improved cam of the present invention permits the arm to readily move inwardly and outwardly, as indicated by arrow "I", as the radially inwardly directed force of the first spring 44 is overcome. The strength of the radially inwardly directed first spring 44 is important in that it pushes the cam follower 50 into the "V" pocket 34 of the rotating cam 24. However, the radially inwardly directed first spring 44 is also weak enough to allow the shift arm 40 to "back up" to permit the passive cam 24 may "back up" or rotate in the opposite direction, as indicated by arrows "A" in FIG. 1, without breaking anything, as may have occurred in the prior art shift devices represented by the '690 Patent. A gear shift handle 60 is arranged with the central shaft 27, to actuate the shifting of the gears "G".

Thus the improved passive cam 24 with its indented cam surface, lacking any "cam-follower capturable" pockets thereon, permits the shifting of gears "G" in a non-damaging manner because of sufficient tension on the first spring 44. Also in this arrangement, the longitudinal axis "L" of the second spring 52 is at a generally perpendicular angle with respect to the longitudinal axis "X" of the first or main spring 44.

Thus, the new shift apparatus 20 permits a passive shifting because of the improved passive cam 24 is permitted to go around backwardly, that is counter-clockwise, without any components thereof breaking.

I claim:

1. A passive shifting apparatus for a marine winch having a plurality of gears thereon, said passive shifting apparatus permitting said winch to be rotated in either a clockwise or counter-clockwise direction, comprising:

a central rotatable shaft with an axis or rotation about which said gears rotate, said shaft supported on a base in a marine winch housing;

a curvilinear cam plate mounted on said rotatable shaft;

a radially inwardly and outwardly movable shift arm with a cam follower thereon engaged against said rotatable curvilinear cam plate;

a first spring arranged between said housing and said shift arm to press said shift arm and cam follower against said curvilinear cam plate; and a second spring arranged between said housing and said shift arm to bias said shift arm in its radial orientation with respect to said rotatable central shaft, wherein said cam follower may move into and out of a slot in said curvilinear cam plate, wherein said slot is arranged in a portion of said cam surface which is of a sinusoidal configuration, said slot being of a generally "V" shaped configuration with an apogee directed towards said central shaft, wherein said cam plate may thus be able to rotate either clockwise or counter-clockwise without locking-up said cam follower on said shift arm.

2. The passive shifting apparatus as recited in claim 1, wherein said second spring is arranged at a perpendicular angle with respect to said shift arm.

3. The passive shifting apparatus as recited in claim 1, wherein said shift arm is longitudinally elongated and is disposed in a groove in said housing base, said groove having a radially inward end with a width which permits said shift arm to have slight lateral movement which occurs during shifting of said gears.

4. The passive shifting apparatus as recited in claim 1, said "V" shaped slot having a first side which is disposed in a near radial orientation with respect to the axis of rotation of said shaft, to permit said cam follower to easily withdraw from said "V" slot during continued rotation of said cam plate without breaking or locking up said cam follower.

5. The passive shifting apparatus as recited in claim 4, wherein said first side of said "V" slot in said cam is disposed at an angle of about 6 to 10 degrees from the radial direction on said cam.

6. A passive shifting apparatus for a marine winch having a plurality of gears thereon, said passive shifting apparatus permitting said winch to be rotated in either a clockwise or counter-clockwise direction, comprising:

a central rotatable shaft with an axis or rotation about which said gears rotate, said shaft supported on a base in a marine winch housing;

a curvilinear cam plate mounted on said rotatable shaft;

a radially inwardly and outwardly movable shift arm with a cam follower thereon engaged against said rotatable curvilinear cam plate;

a first spring arranged between said housing and said shift arm to press said shift arm and cam follower against said curvilinear cam plate;

a second spring arranged between said housing and said shift arm to bias said shift arm in a radial orientation with respect to said rotatable central shaft, wherein said cam follower may move into and out of a slot in said curvilinear cam plate, and said cam plate may be able to rotate either clockwise or counter-clockwise without locking-up said cam follower in said cam plate, said curvilinear cam plate including a surface portion of generally circular configuration and a surface portion of sinusoidal configuration;

said surface portion of sinusoidal configuration including a generally "V" shaped slot with an apogee directed towards said central shaft; said second spring being arranged at a perpendicular angle with respect to said shift arm, said shift arm being longitudinally elongated and disposed in a groove in said housing base, said groove having a radially inward end with a width which permits said shift arm to have slight lateral movement; said "V" shaped slot having a first side which is disposed in a near a radial orientation with respect to the axis of rotation of said shaft, to permit said cam follower to withdraw from said "V" slot during rotation of said cam plate.

* * * * *